US011301288B2

(12) United States Patent
Albasheir

(10) Patent No.: US 11,301,288 B2
(45) Date of Patent: Apr. 12, 2022

(54) CONTAINER MANAGEMENT BASED ON APPLICATION PERFORMANCE INDICATORS

(71) Applicant: T-Mobile USA, Inc., Bellevue, WA (US)

(72) Inventor: Suliman Albasheir, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 28 days.

(21) Appl. No.: 16/870,105

(22) Filed: May 8, 2020

(65) Prior Publication Data
US 2021/0349747 A1 Nov. 11, 2021

(51) Int. Cl.
| | |
|---|---|
| *G06F 15/16* | (2006.01) |
| *G06F 9/54* | (2006.01) |
| *H04L 29/06* | (2006.01) |
| *G06F 9/455* | (2018.01) |
| *G06N 20/00* | (2019.01) |
| *G06F 11/34* | (2006.01) |

(52) U.S. Cl.
CPC ...... *G06F 9/45558* (2013.01); *G06F 11/3409* (2013.01); *G06N 20/00* (2019.01); *G06F 2009/45595* (2013.01)

(58) Field of Classification Search
CPC ....... G06F 9/45558; G06F 2009/45595; G06F 11/3409; H04L 63/10; G06N 20/00
USPC ......................................................... 709/220
See application file for complete search history.

(56) References Cited

U.S. PATENT DOCUMENTS

| | | | | |
|---|---|---|---|---|
| 9,705,751 B1* | 7/2017 | Yi | ........................ | H04L 41/147 |
| 2010/0325642 A1* | 12/2010 | Paramasivam | ....... | G06F 11/302 |
| | | | | 719/317 |
| 2017/0300394 A1* | 10/2017 | Raut | ................... | G06F 11/2048 |
| 2018/0288129 A1* | 10/2018 | Joshi | ....................... | H04L 43/08 |
| 2018/0324802 A1* | 11/2018 | Watts | ...................... | H04L 63/10 |

(Continued)

FOREIGN PATENT DOCUMENTS

WO WO2018089417 A1 5/2018

OTHER PUBLICATIONS

Cheng, "RobOps: Robust Control for Cloud-Based Services", Oct. 18, 2017, ICIAP 17th International Conference, Naples, Italy, pp. 690-705.

(Continued)

*Primary Examiner* — Hamza N Algibhah
(74) *Attorney, Agent, or Firm* — Lee & Hayes, P.C.

(57) ABSTRACT

Techniques for managing containers based on application key performance indicators (KPIs), associated with instances of network applications executing within containers in a telecommunication network, are discussed herein. For example, a container manager can determine that an instance of the network application is underperforming a target KPI value, is otherwise experiencing problems, and/or may be likely to experience future problems. The container manager can accordingly take one or more corrective and/or preventative actions, such as to terminate and replace the container associated with the underperforming instance of the network application, or to scale out a set of containers by adding additional containers and corresponding additional instances of the network application to reduce the load on individual instances of the network application.

19 Claims, 8 Drawing Sheets

(56) References Cited

U.S. PATENT DOCUMENTS

| | | | |
|---|---|---|---|
| 2018/0349199 A1 | 12/2018 | Vyas et al. | |
| 2018/0359218 A1* | 12/2018 | Church | H04L 63/0272 |
| 2020/0034127 A1* | 1/2020 | Burrowes | G06F 8/60 |
| 2020/0082095 A1* | 3/2020 | Mcallister | G06F 11/323 |
| 2020/0097662 A1* | 3/2020 | Hufsmith | H04L 67/10 |
| 2020/0136920 A1* | 4/2020 | Doshi | H04L 41/16 |
| 2020/0233691 A1* | 7/2020 | Rizvi | H04L 67/1095 |
| 2020/0320432 A1* | 10/2020 | Chan | G05B 17/02 |
| 2020/0327006 A1* | 10/2020 | Khanna | G06F 11/0739 |
| 2021/0068045 A1* | 3/2021 | Regnault | H04W 24/02 |
| 2021/0168052 A1* | 6/2021 | Parulkar | H04L 12/66 |
| 2021/0168203 A1* | 6/2021 | Parulkar | H04L 67/148 |
| 2021/0208961 A1* | 7/2021 | Dutta | G06F 11/0751 |

OTHER PUBLICATIONS

Extended European Search Report dated Sep. 15, 2021 for European Patent Application No. 21172416.6, 9 pages.

* cited by examiner

CONTAINER MANAGEMENT BASED ON APPLICATION PERFORMANCE INDICATORS

BACKGROUND

A telecommunication network can operate in part using one or more network applications. For example, a fifth generation (5G) telecommunication network can have a service-based system architecture in which various types of network applications, known as network functions, can work together to implement services within the 5G telecommunication network.

Rather than providing distinct hardware elements to operate different instances of network applications, many types of network applications can run inside virtual and/or isolated computing environments known as containers. Containers can be associated with dedicated computing resources, and instances of network applications can execute inside containers using the dedicated computing resources associated with the containers. A set of containers can be managed by a container manager, such as a container orchestrator.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
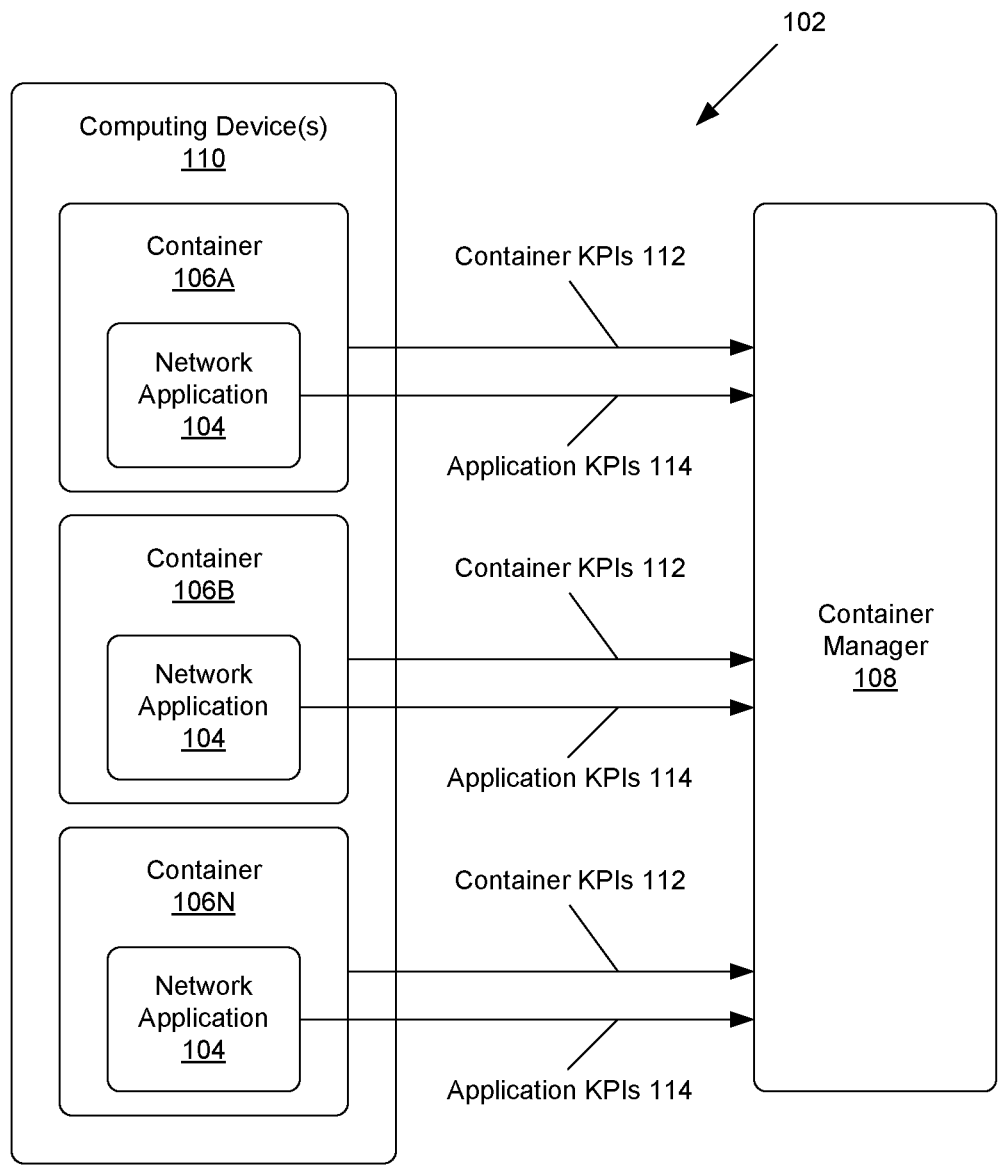
FIG. 1 depicts an example of a telecommunication network that executes instances of network applications within containers managed by a container manager.

In some telecommunication networks, network applications can operate alone or together to implement services for subscribers and other users. For example, fifth generation (5G) telecommunication networks can have a service-based system architecture in which multiple network applications, known as network functions (NFs), can communicate with each other to implement services for users.

In some telecommunication networks, instances of one or more types of network applications can be executed within containers. Each container can be a virtual and/or isolated computing environment that has dedicated computing resources, such that problems with one container or an instance of a network application running in that container are unlikely to cause problems with other containers or instances of network applications running in the other containers. Containers can be similar to virtual machines, but may have a smaller footprint than virtual machines. For example, while multiple virtual machines may run on a computing device, generally each virtual machine has its own operating system. In contrast, multiple containers running on a computing device may share an operating system of the computing device, but have other dedicated computing resources specific to each container.

A container manager may manage a set of containers within a telecommunication network. A container manager may sometimes be known as a container orchestrator. In some existing systems, a container manager may be configured monitor the health and/or performance of each container in a set of containers. Based on the monitored health and/or performance of individual containers, and/or the set of containers as a whole, such container managers may be configured to take actions such as terminating containers, adding additional containers, and/or terminating and replacing containers.

However, in such existing systems, the container manager generally only has access to performance indicators related to the health and/or performance of the containers themselves. For example, a container manager may receive or access performance indicators about memory usage and/or processor usage associated with a container. However, such existing container managers generally do not have visibility into the health and/or performance of individual instances of network applications executing within those containers. Accordingly, container managers in such existing systems may not be capable of determining when an instance of a network application inside a container is experiencing problems.

For example, if performance indicators about a container indicate that the container itself is performing as expected, existing container managers may not be able to determine that an instance of a network application inside that container is experiencing problems. For instance, such existing container managers may not be able to determine that an instance of a network application in one container is underperforming relative to other instances of that network application in other containers.

The systems and methods described herein can allow a container manager to manage containers in a telecommunication network based on application performance indicators associated with instances of network applications instead of, or in addition to, container performance indicators. For example, if application performance indicators indicate that an instance of a network application inside a container is underperforming relative to target performance level and/or relative to other instances of the network application in other containers, a container manager may choose to terminate and replace the container to in turn terminate and replace the underperforming instance of the network application, even though the container itself may have been performing as expected. As another example, if application performance indicators indicate that a first instance of a network application executing inside a first container is underperforming, a container manager may choose to create additional containers to in turn add additional instances of the network application and thereby reduce the load on the first instance of the network application, even if the first container was itself performing as expected.

Example Environment

FIG. 1 depicts an example of a telecommunication network 102 that executes instances of network applications 104 within containers 106 managed by a container manager 108. The container manager 108 can manage a set of containers 106 that are associated with instances of one or more types of network applications 104.

The containers 106 can be virtual and/or isolated computing environments associated with dedicated computing resources of one or more computing devices 110 of the telecommunication network 102. For example, a particular container 106 can be associated with a dedicated amount of memory at a memory location on a computing device 110, dedicated processor cycles on a computing device 110, and/or other dedicated resources on a computing device 110. In some examples, a computing device 110 can provide a shared operating system and/or other shared resources to a set of containers 106 associated with that computing device 110, however each individual container 106 can be associated with dedicated computing resources of the computing device 110 for an instance of a network application 104.

The container manager 108 can be a manager or orchestrator that is configured to manage a set of containers 106 across one or more computing devices 110. In some examples, the container manager 108 can itself execute as a network application 104 or other type of process on a computing device 110. An example system architecture for a computing device 110 that can execute the container manager 108 is described in more detail below with respect to FIG. 6.

The container manager 108 can manage a set of containers 106 in part by adding containers 106 to the set, removing containers 106 from the set, terminating and replacing containers 106 in the set, and/or taking other actions with respect to one or more of the containers 106 in the set. For example, the container manager 108 can replace a container 106 by terminating that container 106 and creating a new container 106 as a replacement for the terminated container 106. As another example, the container manager 108 can create and deploy a new container 106 to scale out the set of containers 106. The container manager 108 may also terminate a container 106, without replacing that container 106, to scale down the set of containers 106.

The network applications 104 can include one or more type of computer-executable application that can run within containers 106 on the telecommunication network 102. For example, a network application 104 can be a cloud-native application, a network function, a network process, a virtual implementation of a network node, and/or any other type of network application 104.

Figure 2:
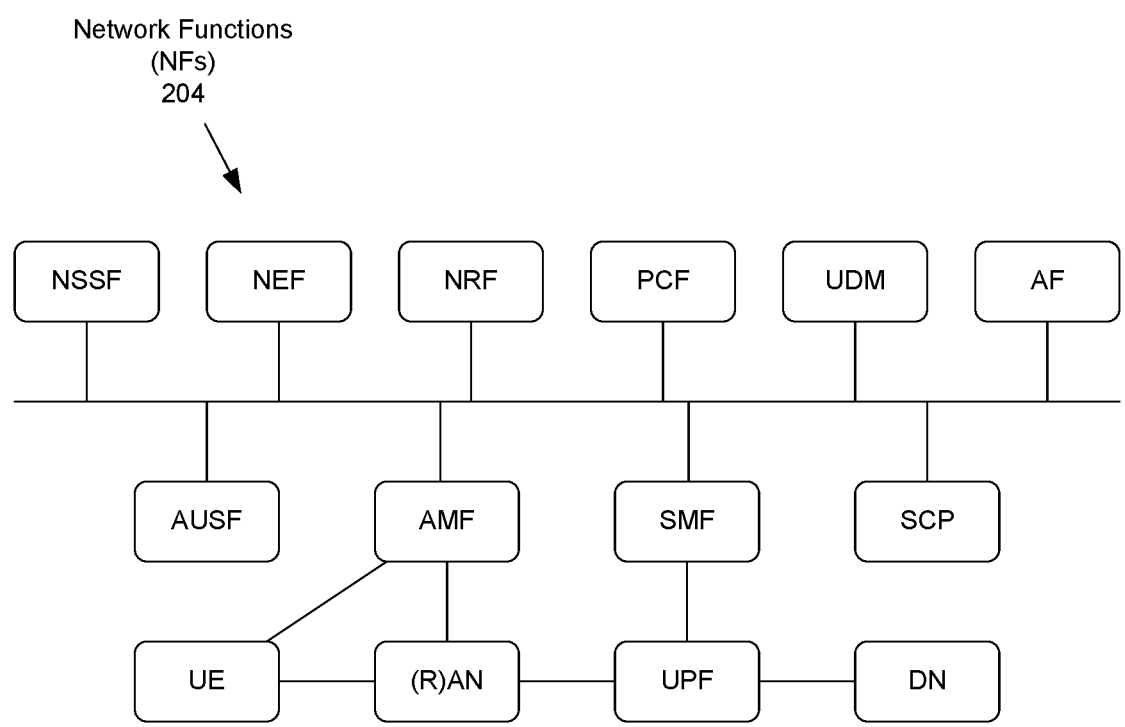
FIG. 2 depicts an example system architecture for a fifth generation (5G) telecommunication network.

As an example, FIG. 2 depicts a system architecture for a fifth generation (5G) telecommunication network 102. Some telecommunication networks 102, such as the 5G telecommunication network 102 shown in FIG. 2, have a service-based system architecture in which different types of network functions (NFs) 202 operate alone and/or together to implement services. 5G standards define many types of NFs 202 that can be present in 5G telecommunication networks 102, including an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 2.

Many of the NFs 202 of a 5G telecommunication network 102 can be implemented as network applications 104 that execute within containers 106. 5G NFs 202 can execute as hardware elements, software elements, and/or combinations of the two within telecommunication networks 102, and accordingly many types of 5G NFs 202 can be implemented as software or as virtualized functions that execute on cloud servers or other computing devices 110. As such, many types of 5G NFs 202 can be executed as network applications 104 within containers 106 as shown in FIG. 1. Network applications 104 that can execute within containers 106 can also include any other type of network function, application, entity, module, element, or node. Additionally, although network applications 104 can be 5G NFs 202 within a 5G telecommunication network 102, the telecommunication network 102 can be a Long-Term Evolution (LTE) network or any other generation of telecommunication network 102 that uses NFs 202, or other types of network applications 104, that can execute within containers 106 as described herein.

Returning to FIG. 1, the container manager 108 can receive container key performance indicators (KPIs) 112 associated with containers 106. The container KPIs 112 can include one or more types of metrics associated with the health and/or performance of the containers 106, such as metrics regarding utilization of memory, processors, and/or other computing resources on computing devices 110 by individual containers 106. For example, a container KPI 112 can indicate an amount of memory that a particular container 106 is using on a computing device 110. As other examples, container KPIs 112 can indicate an amount of processor cycles that a particular container 106 is using on a computing device 110, a number of interrupts associated with a particular container 106, and/or other metrics associated with the health and/or performance of the particular container 106 overall.

Although container KPIs 112 may indicate the health and/or performance of a container 106 overall, the container KPIs 112 may not directly reflect the health and/or performance of an instance of a network application 104 executing within that container 106. Accordingly, network applications 104 executing within containers 106 can send application KPIs 114 to the container manager 108. The application KPIs 114 can include one or more types of metrics associated with the health and/or performance of instances of network applications 104 executing within containers 106. For example, application KPIs 114 can indicate metrics associated with network applications 104 such as Protocol Data Unit (PDU) activation success rates, handover success rates, request timeouts, application level packet drop rates, session average throughput metrics, a number of failed sessions, average latencies of calls, a number of dropped calls, a number of messages rejected by instances of network applications 104 in other containers 106, and/or any other metric associated with the health and/or performance of network applications 104.

The types of application KPIs 114 sent to the container manager 108 by an instance of a network application 104 may vary depending on the type of the network application 104. For example, instances of SMFs and/or AMFs may send application KPIs 114 to the container manager 108 that include PDU session activation success rates, handover success rates, request timeout metrics, and/or other metrics associated with performances of the SMF instances and/or the AMF instances. However, as another example, instances of a UPF may send different types of application KPIs 114 to the container manager 108, such as metrics of application level packet drops, session average throughput metrics, and/or other metrics associated with performances of the UPF instances.

The container manager 108 can be configured to determine, based on application KPIs 114, when an instance of a network application 104 executing within a container 106 is underperforming, is experiencing problems, and/or may be likely to experience problems in the future. In some examples, the container manager 108 may determine that an instance of a network application 104 is underperforming, is experiencing problems, or may be likely to experience problems in the future when application KPIs 114 associated with that instance of the network application 104 are lower than a target KPI value by more than a threshold amount. The container manager 108 can also be configured to perform one or more corrective and/or preventative actions on a set of containers 106 upon determining that an instance of a network application 104 is underperforming, is experiencing problems, or is likely to experience future problems, as will be described further below.

In some examples, a target KPI value can be a preset target value for a type of application KPI 114. For example, a target value or goal for a handover success rate for SMF instances can be set at 90%. Accordingly, if a particular SMF instance sends application KPIs 114 to the container manager 108 that indicate that the particular SMF instance has a handover success rate of 80%, the container manager 108 can determine that the particular SW instance is underperforming relative to the preset target KPI value of 90%. In other examples, any other preset or otherwise determined target KPI value can be used.

In other examples, a target KPI value for a type of application KPI 114 can be dynamically determined by the container manager 108 based on values of that application KPI 114 received from multiple instances of that type of network application 104. For example, the container manager 108 can receive application KPIs 114 from multiple instances of a network application 104 executing within a set of containers 106. In some examples, the container manager 108 can accordingly set a target KPI value based on an average of the application KPIs 114 associated with the multiple instances of a network application 104. In other examples, the container manager 108 can set a target KPI value based on other statistical data derived from application KPIs 114 associated with the multiple instances of a network application 104, such as a median value, mode value, or other statistical metric derived from the application KPIs 114. In still other examples, a target KPI value can be based on an average value for application KPIs 114 received over a particular time period, a historical average of application KPIs 114, a range of values associated with a standard deviation, and/or other metrics or statistical data. In some examples, the container manager 108 can use machine learning models, trained based on historical data about application KPIs 114 and/or information about previous problems experienced by network applications 104, to identify target KPI values that can be indicative of problems with network applications 104.

The container manager 108 can then compare application KPIs 114 received from any individual instance of the network application 104 against a target KPI value derived from application KPIs 114 received from a larger set of instances of the network application 104. As an example, the container manager 108 can determine that an AMF instance is underperforming, relative to a larger set of AMF instances executing in a set of containers 106, when that AMF instance reports a PDU activation success rate that is lower than an average PDU activation success rate across the set of AMF instances.

Accordingly, even if container KPIs 112 do not indicate that a container 106 is experiencing problems, the container manager 108 can use application KPIs 114 to determine when an instance of a network application 104 executing within that container 106 is itself underperforming. For example, memory KPIs, processor KPIs, and/or other container KPIs 112 may indicate to a container manager 108 that a container 106 is performing as expected. However, application KPIs 114 may nevertheless indicate to the container manager 108 that an instance of a network application 104 executing within the container 106 is underperforming relative to a preset target KPI value and/or relative to other instances of the network application 104 that are executing within other containers 106 managed by container manager 108.

In some examples, a container manager 108 can also use application KPIs 114 to determine a likelihood of a network application 104 developing problems and/or underperforming in a future time period. For example, a target KPI value may be set such that application KPIs 114 under the target KPI value may not indicate a current underperformance of a network application 104, but the application KPIs 114 being under the target KPI value may be an indication that performance of the network application 104 is trending towards future underperformance and/or that the network application 104 may be likely to experience problems in the future.

Figure 3A:
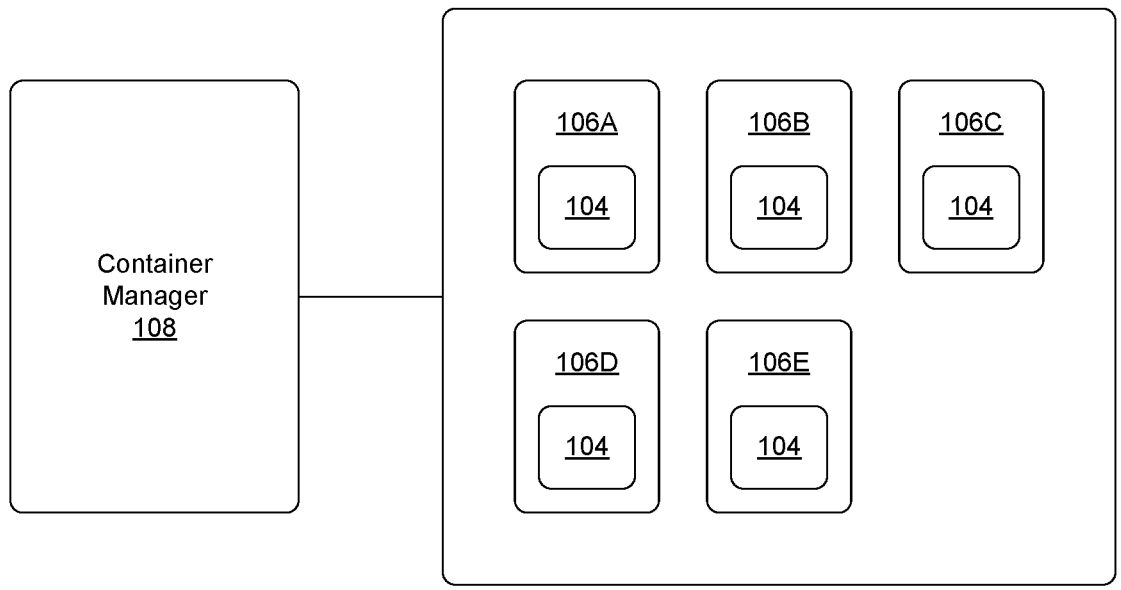
FIGS. 3A and 3B depict an example in which a container manager performs a corrective action of replacing a container.
Figure 3B:
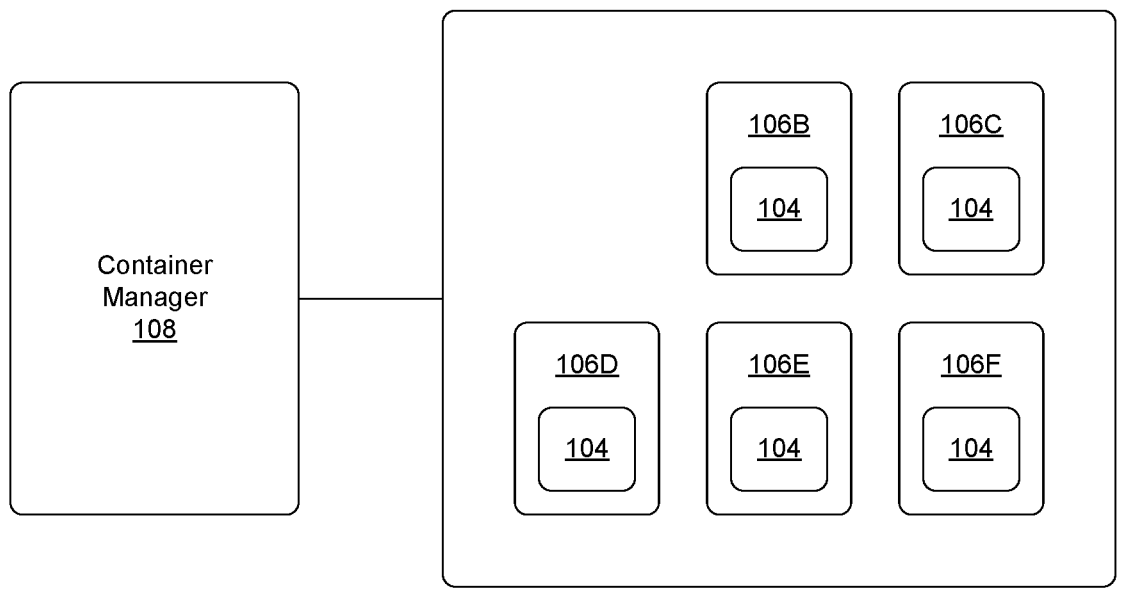
Figure 4A:
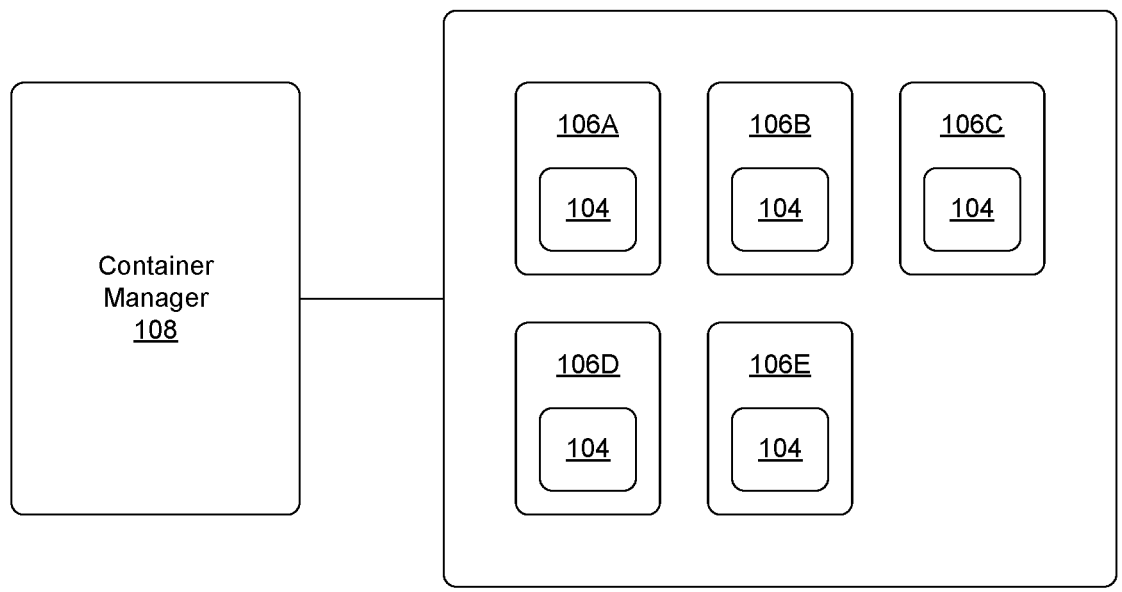
FIGS. 4A and 4B depict an example in which a container manager performs a corrective action of scaling out a set of containers.
Figure 4B:
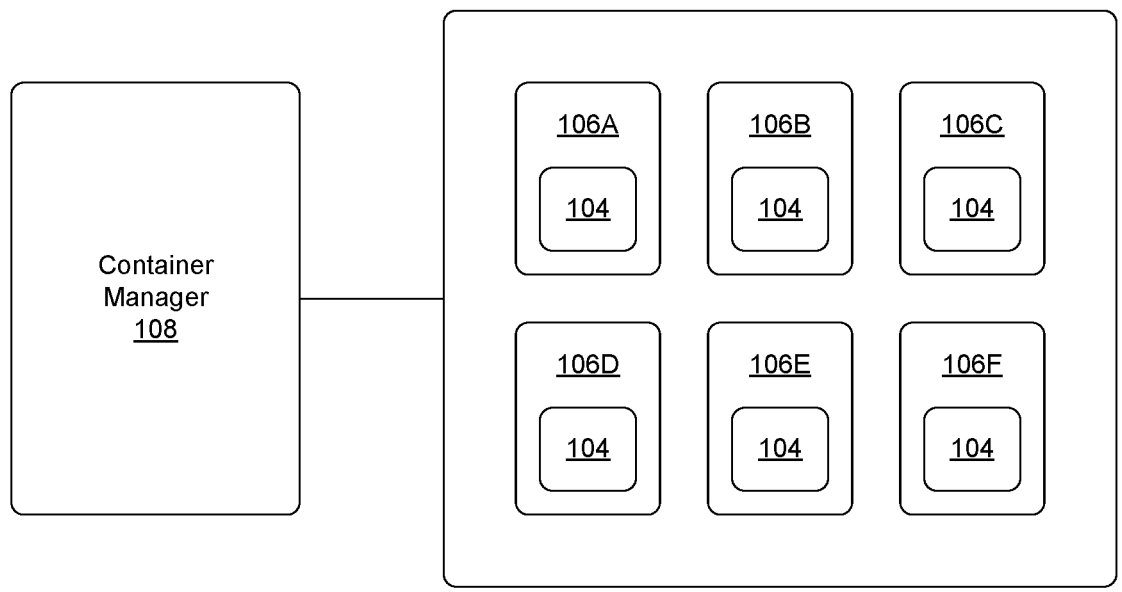

If the container manager 108 determines that an instance of a network application 104 is underperforming, is otherwise experiencing problems, and/or is likely to experience problems in the future, the container manager 108 can perform one or more corrective actions on a set of containers 106. In some examples, corrective actions may resolve a current and/or ongoing problem with the instance of the network application 104. In other examples, corrective actions may be preventative actions that can prevent or avoid likely future problems with the instance of the network application 104. The corrective actions can include terminating and replacing the container 106 associated with the instance of the network application 104 within the set of containers 106, as shown in FIGS. 3A and 3B. Corrective actions can also, or alternately, include scaling out the set of containers 106 by adding one or more additional containers 106 to a set of containers 106, as shown in FIGS. 4A and 4B. In some examples, scaling out a set of containers 106 may also, or alternately, involve changing dedicated resources associated with containers 106. For examples, the container manager 108 may cause an increase in an amount of dedicated memory associated with a particular container 106, which may improve performance of an instance of a network application 104 within that particular container 106.

FIGS. 3A and 3B depict an example in which a container manager 108 performs a corrective action of replacing a container 106, based on a determination that an instance of a network application 104 in the container 106 is underperforming, is otherwise experiencing problems, and/or may be likely to experience problems in the future. For example, in FIG. 3A the container manager 108 manages a set of five containers 106, each of which executes an instance of the same network application 104. In this example, the container manager 108 may determine, based on application KPIs 114, that the instance of the network application 104 executing in container 106A is underperforming by more than a threshold amount relative to instances of the network application 104 executing in containers 106B-106E. In this example, the container manager 108 can respond by terminating the container 106A associated with the underperforming instance of the network application 104, thereby also terminating the underperforming instance of the network application 104, as shown in FIG. 3B. The container manager 108 can also create a new container 106F as a replacement for terminated container 106A, and cause a replacement instance of the network application 104 to execute in the replacement container 106F, as shown in FIG. 3B.

In some examples, the container manager 108 may create the replacement container 106F before terminating container 106A, and cause state data and/or other data to be transferred from the instance of the network application 104 in container 106A to the new replacement instance of the network application 104 in container 106F. Accordingly, the replacement instance of the network application 104 in container 106F may be configured to take over sessions previously handled by the underperforming instance of the network application 104 in container 106A.

Overall, the corrective action shown in the example of FIGS. 3A and 3B can replace an underperforming or problematic instance of a network application 104 in an old container 106 with a new instance of the network application 104 in a new container 106, and effectively restart or reboot the underperforming or problematic instance of the network application 104 within a new replacement container 106. In some situations, the new instance of the network application 104 may perform better and/or report better application KPIs 114 than the terminated underperforming instance of the network application 104 did. For example, if the underperforming instance of the network application 104 had been executing in a memory location associated with the old container 106A that was corrupted or was otherwise causing the instance of the network application 104 to underperform (even if container KPIs 112 indicated that container 106A as a whole was operating as expected), the replacement instance of the network application 104 may execute in a different memory location associated with the new container 106F that is not corrupted and/or may not cause similar underperformance of the new instance of the network application 104.

FIGS. 4A and 4B depict an example in which a container manager 108 performs a corrective action of scaling out a set of containers 106, based on a determination that an instance of a network application 104 in a container 106 is underperforming, is otherwise experiencing problems, and/or may be likely to experience problems in the future. For example, in FIG. 4A the container manager 108 manages a set of five containers 106, each of which executes an instance of the same network application 104. Similar to the example of FIG. 3A, the container manager 108 may determine, based on application KPIs 114, that the instance of the network application 104 executing in container 106A is underperforming relative to relative to instances of the network application 104 executing in containers 106B-106E. However, in FIG. 4B the container manager 108 may determine from application KPIs 114 that the instance of the network application 104 in container 106A is processing more traffic, is handling more sessions, or is otherwise overloaded relative to the other instances of the network application 104 in containers 106B-106E.

In this example, the container manager 108 can respond by scaling out the set of containers 106 by adding one or more additional containers 106, such as new container 106F. The container manager 108 can also cause one or more additional instances of the network application 104 to execute in the one or more new containers 106. Accordingly, by adding at least one new container 106 to the set of containers 106 that is associated with at least one additional instance of the network application 104, the at least one additional instance of the network application 104 may lessen the load on the underperforming instance of the network application 104. In some situations, lowering the load on the instance of a network application 104 can lead to improved performance of that instance of the network application 104.

For example, in FIG. 4B the container manager 108 can add new container 106F to the set of containers 106 while continuing to keep container 106A in the set of containers 106, such that six containers 106 and six corresponding instances of the network application 104 are present. Sessions, traffic, or other data can be distributed among the six instances of the network application 104 shown in FIG. 4B, instead of among the five instances of the network application 104 shown in FIG. 4A, thereby reducing the load on the instance of the network application 104 in container 106A. In some examples, the instances of the network application 104 can communicate to distribute loads among the instances of the network application 104. In other examples, a load balancer in the telecommunication network 102 can distribute loads among the instances of the network application 104.

In some examples, after scaling out the set of containers 106 as shown in FIGS. 4A and 4B, subsequent application KPIs 114 may subsequently indicate that the previously underperforming instance of the network application 104 in container 106A is no longer overloaded or is no longer underperforming relative to other instances of the network application 104 in the other containers 106. However, if the subsequent application KPIs 114 continue to indicate that the instance of the network application 104 in container 106A is overloaded or is otherwise underperforming relative to other instances of the network application 104, the container manager 108 may perform a different type of corrective action, such as by terminating and replacing the container 106A associated with the underperforming instance of the network application 104 as described above with respect to FIGS. 3A and 3B.

Figure 5:
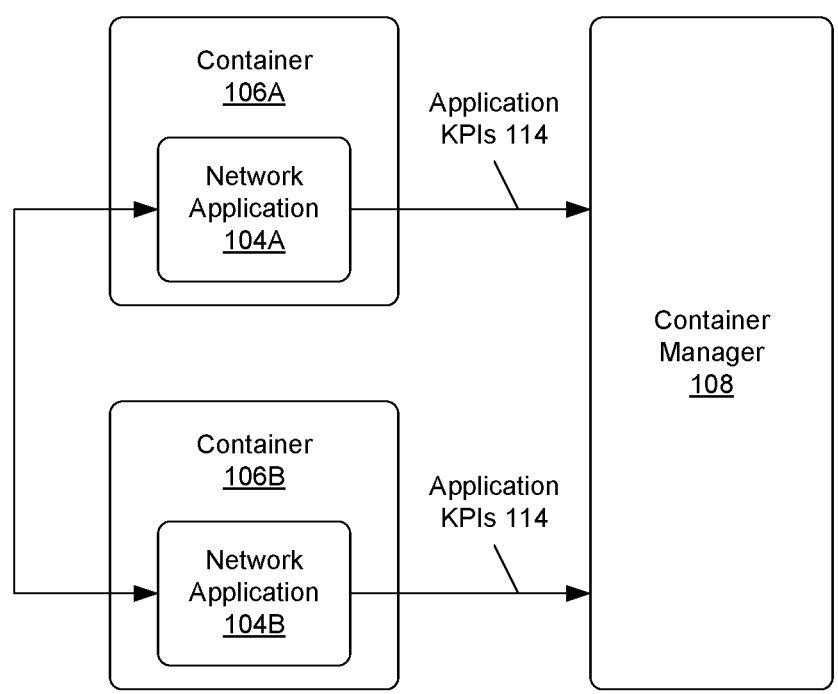
FIG. 5 depicts an example in which a container manager manages containers associated with different types of network applications.

FIG. 5 depicts an example in which a container manager 108 manages containers 106 associated with different types of network applications 104. As discussed above, instances of network applications 104 can send application KPIs 114 to the container manager 108 that reflect the health and/or performance of the instances of the instances of network applications 104 that are sending the application KPIs 114 to the container manager 108. However, in some situations, application KPIs 114 sent by an instance of a first type of network application 104 may also directly and/or indirectly reflect the health and/or performance of an instance of a second type of network application 104 that the first type of network application 104 interacts with. Accordingly, in some examples, a container manager 108 may determine that a corrective action should be taken with respect to a container 106 executing the instance of the second type of network application 104, based on application KPIs 114 received from an instance of the first type of network application 104.

As an example, in FIG. 5, the instance of network application 104A in container 106A may be an AMF instance, and the instance of network application 104B in container 106B may be an SMF instance. The AMF instance and the SMF instance may be configured to communicate within the telecommunication network 102 to set up and manage PDU sessions for user devices. For example, the AMF instance can send session activation requests to the SMF instance, and normally the SMF instance may respond by setting up the requested sessions and returning a response to the AMF instance. However, due to a communication interface problem, network data transfer problem, or other issue, responses sent by the SMF instance may not reach the AMF instance, and the AMF instance may experience a timeout associated with the SMF instance. The AMF instance can include associated timeout data in application KPIs 114 sent by the AMF instance to the container manager 108. The container manager 108 can determine from the application KPIs 114 received from the AMF instance that an issue with the SMF instance, not the AMF instance, is causing the timeouts at the AMF instance. Accordingly, the container manager 108 may take a corrective action to terminate and replace the container 106 associated with the problematic SMF instance.

In some cases, in this example the SMF instance may have been setting up sessions as expected, but responses that the SMF instance attempted to send may have been lost due to an interface issue or other problem before reaching the AMF instance. Accordingly, the SMF instance may itself have been sending application KPIs 114 to the container manager 108 that reflected expected performance of the SME instance. However, here the application KPIs 114 received from the AMF instance can be used by the container manager 108 to diagnose or detect an issue with the SMF instance that was not indicated by the application KPIs 114 received directly from the SMF instance.

As discussed above, the container manager 108 can be configured to determine when instances of network applications 104 executing within containers 106 are underperforming, are experiencing problems, and/or are likely to experience future problems based on application KPIs 114 reported by instances of the network applications, and can determine a corrective action to take on a set of containers 106 based on the reported application KPIs 114. However, in other examples, the container manager 108 can use a machine learning model to predict application KPIs 114 associated with instances of network application 104 based on reported container KPIs 112, as will be described further below. In these examples, the container manager 108 can accordingly determine corrective actions to take on a set of containers 106 based on the application KPIs 114 predicted by the machine learning model, as will be described further below.

Example Architecture

Figure 6:
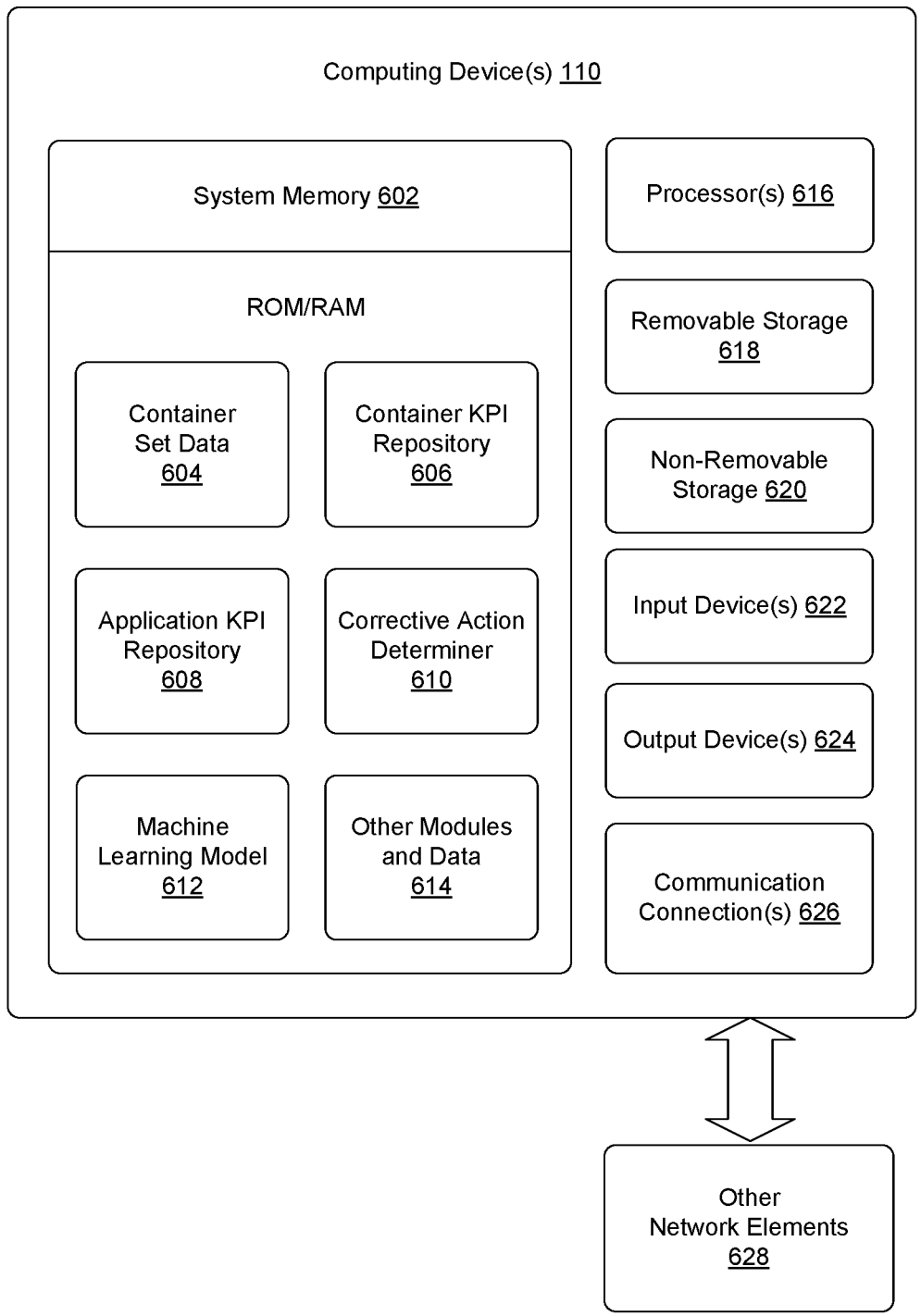
FIG. 6 depicts an example system architecture for a computing device that can execute a container manager.

FIG. 6 depicts an example system architecture for a computing device 110 that can execute a container manager 108. In some examples, a computing device 110 as shown in FIG. 6 can also, or alternately, execute one or more network applications 104 within one or more containers 106, as described above.

A computing device 110 can have a system memory 602 that stores data for the container manager 108, including container set data 604, a container KPI repository 606, an application KPI repository 608, a corrective action determiner 610, a machine learning model 612, and/or other modules and data 614. In some examples, some elements of the container manager 108 can be duplicated and/or distributed among different computing devices 110. For instance, in some examples, a container KPI repository 606 or an application KPI repository 608 can be stored at a first computing device 110, and a second computing device 110 can execute the corrective action determiner 610 and/or machine learning model 612 based on container KPIs 112 and/or application KPIs 114 retrieved from the first computing device 110.

In various examples, system memory 602 can be volatile (such as RAM), non-volatile (such as ROM, flash memory, etc.), or some combination of the two. Example system memory 602 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The container set data 604 can contain data about containers 106 being managed by the container manager 108. For example, the container set data 604 can identify individual containers 106 managed by the container manager 108, identify instances of network applications 104 and/or types of network applications 104 executing in the containers 106, identify computing devices 110 associated with the containers 106, and/or indicate any other information about containers 106 in a set of containers 106 managed by the container manager 108.

The container KPI repository 606 can be a database or other collection of container KPIs 112 associated with one or more containers 106 managed by the container manager 108. In some examples, the container manager 108 can receive container KPIs from containers 106 or computing devices 110, and can accordingly store the received container KPIs 112 in the container KPI repository 606. The container KPI repository 606 can index received container KPIs 112 with respect to corresponding containers 106.

The application KPI repository 608 can be a database or other collection of application KPIs 114 associated with instances of one or more types of network application 104 executing within containers 106 managed by the container manager 108. In some examples, the container manager 108 can receive application KPIs 114 from instances of network application 104 within containers 106, and can accordingly store the received application KPIs 114 in the application KPI repository 608. In other examples, the container manager 108 can store application KPIs 114 predicted by the machine learning model 612 in the application KPI repository 608. The application KPI repository 608 can index received and/or predicted application KPIs 114 with respect to corresponding instances of network applications 104 in corresponding containers 106.

The corrective action determiner 610 can be configured to determine if received and/or predicted application KPIs 114 indicate an underperformance of an instance of a network application 104 in a container 106 relative to a target KPI value, or other type of current or future problem with the instance of a network application 104, as described herein. The corrective action determiner 610 can also be configured to determine a type of corrective and/or preventative action to take when such an underperformance, current problem, or likely future problem with an instance of a network application 104 is detected, such as to terminate and replace a corresponding container 106 or to scale out the set of containers 106, as described herein.

The machine learning model 612 can be trained to generate, from container KPIs 112, predicted application KPIs 114. In some examples, the machine learning model 612 can be trained using supervised machine learning based on training sets of received container KPIs 112 and received application KPIs 114, until the machine learning model 612 can predict the training set of application KPIs 114 from the training set of container KPIs 112. For example, the machine learning model 612 can be trained based on correlations found between container KPIs 112 and application KPIs 114 in the training sets. The machine learning model 612 can provide predicted application KPIs 114 to the application KPI repository 608 and/or the corrective application determiner 610 as described above. In some examples, the machine learning model 612 can also, or alternately, be trained based on historical data about application KPIs 114 and previous problems associated with network applications 104, and generate target KPI values that can be indicative of current problems with network applications 104 and/or future problems with network applications 104. The machine learning model 612 can be based on support-vector networks, linear regression, logistic regression, nearest-neighbor algorithms, decision trees, recurrent neural networks or other types of neural networks, and/or other machine learning and/or artificial intelligence techniques. The machine learning model 612 is described in further detail below with respect to FIG. 8.

The other modules and data 614 can be utilized by the computing device 110 to perform or enable performing any action taken by the container manager 108. The other modules and data 614 can include a platform and applications, and data utilized by the platform and applications.

The computing device 110 can also include processor(s) 616, removable storage 618, non-removable storage 620, input device(s) 622, output device(s) 624, and/or communication connections 626 for communicating with other network elements 628.

In some embodiments, the processor(s) 616 can be a central processing unit (CPU), a graphics processing unit (GPU), both CPU and GPU, or other processing unit or component known in the art.

The computing device 110 can also include additional data storage devices (removable and/or non-removable) such as, for example, magnetic disks, optical disks, or tape. Such additional storage is illustrated in FIG. 6 by removable storage 618 and non-removable storage 620. Computer storage media may include volatile and nonvolatile, removable and non-removable media implemented in any method or technology for storage of information, such as computer readable instructions, data structures, program modules, or other data. System memory 602, removable storage 618 and non-removable storage 620 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the computing device 110. Any such computer-readable storage media can be part of the computing device 110. In various examples, any or all of system memory 602, removable storage 618, and non-removable storage 620, store programming instructions which, when executed, implement some or all of the herein-described operations of the container manager 108.

In some examples, the computing device 110 can also have input device(s) 622, such as a keyboard, a mouse, a touch-sensitive display, voice input device, etc., and/or output device(s) 624 such as a display, speakers, a printer, etc. These devices are well known in the art and need not be discussed at length here.

The computing device 110 can also contain communication connections 626 that allow the computing device 110 to communicate with other network elements 628, such as other computing devices 110 that execute instances of network applications 104 within containers 106. For example, the communication connections 626 can enable the container manager 108 to receive container KPIs 112 associated with containers 106, application KPIs 114 associated with instances of network applications 104, and/or send instructions to other computing devices 110 or network elements to perform or initiate corrective actions such as replacing a container 106 or scaling out a set of containers 106 as described herein.

Example Operations

Figure 7:
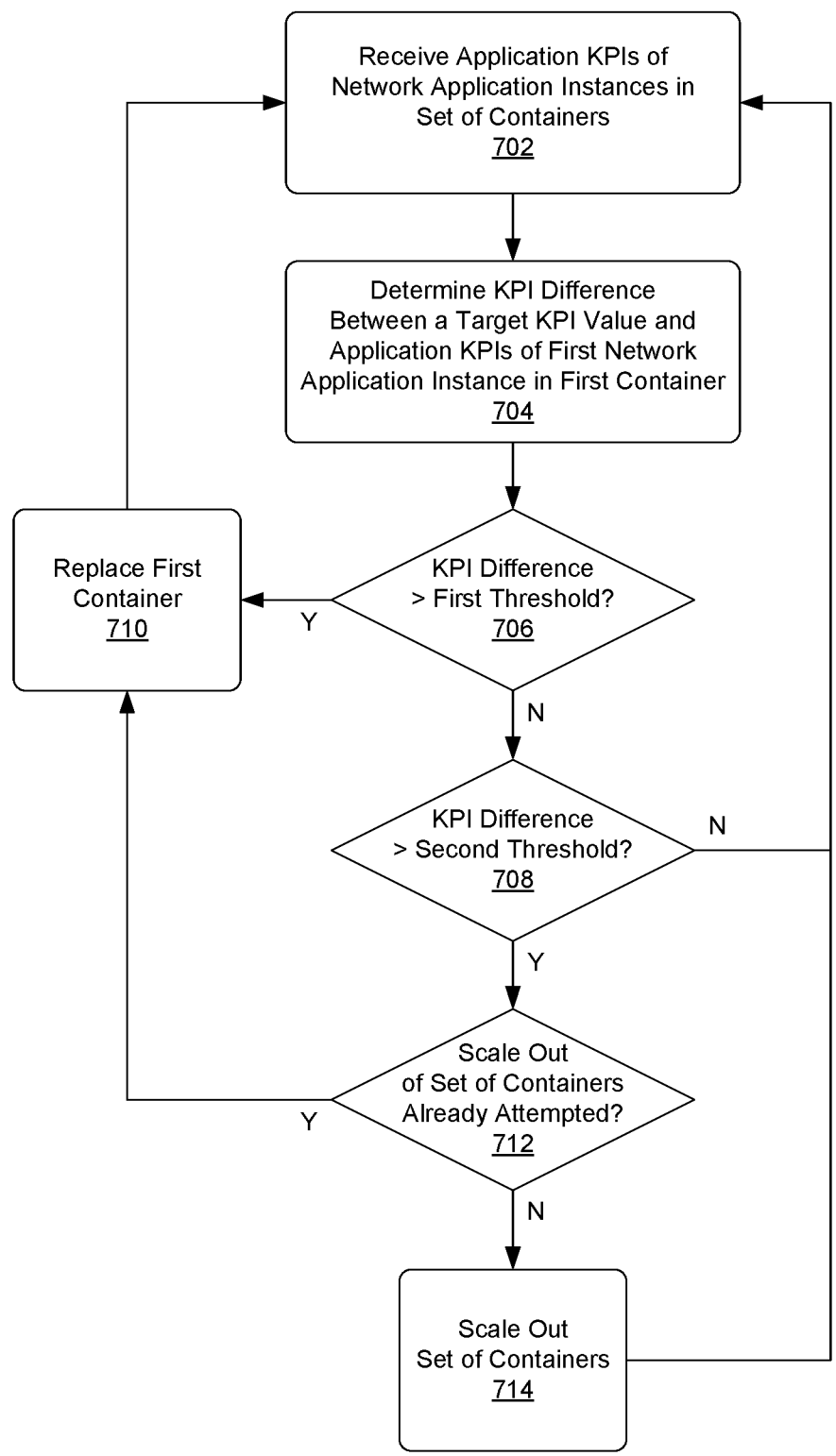
FIG. 7 depicts a flowchart of a method by which a container manager can determine corrective actions to perform on a set of containers, based at least in part on application key performance indicators (KPIs).

FIG. 7 depicts a flowchart of a method by which a container manager 108 can determine corrective actions to perform on a set of containers 106, based at least in part on application KPIs 114.

At block 702, the container manager 108 can receive application KPIs 114 from instances of one or more network applications 104 executing within a set of containers 106 managed by the container manager 108. The application KPIs 114 can be metrics that reflect the health and/or performance of instances of network applications 104 within the containers 106. In some examples, application KPIs 114 sent to the container manager 108 by an instance of a network application 104 can indicate the health and/or performance of that instance of the network application 104. In other examples, application KPIs 114 sent to the container manager 108 by an instance of a network application 104 may also, or alternately, directly or indirectly indicate the health and/or performance of an instance of a different network application 104.

At block 704, the container manager 108 can determine a KPI difference between a target KPI value and application KPIs 114 associated with a first instance of a network application 104 executing within a first container 106. For example, the container manager 108 can identify application KPIs 114 directly reported by the first instance of a network application 104, and/or identify application KPIs 114 reported by other instances of the network application 104 or instances of a different type of network application 104 that may be indicative of the health and/or performance of the first instance of the network application 104. The container manager 108 can then determine a difference between a target KPI value and the application KPIs 114 of the first instance of the network application 104 in the first container 106. In some examples, the target KPI value can be a preset goal for a type of application KPI 114. In other examples, the target KPI value can be an average of applications KPI 114 received at block 702 that are associated with multiple instances of the network application 104 within the set of containers 106 managed by the container manager 108. In still other examples, the target KPI value can be determined using machine learning or other techniques based on historical data about application KPIs 104 that have been indicative of ongoing and/or upcoming problems with network applications 104.

As an example, when the network application 104 is an SMF and the application KPIs 114 include a PDU activation success rate, the target KPI value may be a 95% success rate based on a preset value or based on an average of PDU activation success rates reported in application KPIs 114 from a set of SMF instances executing within the set of containers 106. In this example, the container manager 108 may use application KPIs 114 associated with a first SMF instance to determine that the first SMF instance has an 80% PDU activation success rate. Accordingly, in this example, the container manager 108 can determine that the first SMF instance is associated with a KPI difference of 15% less than the target KPI value at block 704.

The container manager 108 can determine if the KPI difference determined at block 704 is greater than a first threshold at block 706 and/or is greater than a second threshold at block 708. The first threshold considered at block 706 can be greater than the second threshold considered at block 708. For example, the first threshold may be a 50% difference relative to the target KPI value, while the second threshold may be a 50% difference relative to the target KPI value. In other examples, the first threshold and the second threshold can be higher or lower than these example values, and/or be closer together or be farther apart than these example values.

If the container manager 108 determines that the KPI difference associated with the first instance of the network application 104 determined at block 704 is greater than a first threshold at block 706, the container manager 108 can move to block 710 and perform a corrective action of replacing the first container 106 within which the first instance of the network application 104 is executing. For example, if the first threshold is set at a 50% difference relative to a target KPI value, and a KPI difference associated with the first instance of the network application 104 indicates that the first instance of the network application 104 is underperforming an average KPI value or other target KPI value by 60%, the container manager 108 can move to block 710 and replace the container 106 containing the underperforming first instance of the network application 104.

In particular, at block 710, the container manager 108 can terminate the first container 106 to in turn terminate the first instance of the network application 104. The container manager 108 can also create a replacement container 106 at block 710, and cause a replacement instance of the network application 104 to execute within the replacement container 106. As discussed above with respect to FIGS. 3A and 3B, the corrective action of terminating and replacing a container 106 associated with an underperforming instance of a network application 104 can effectively reboot or restart the underperforming instance of a network application 104 in a new and different container 106. The container manager 108 can then return to block 702 to receive subsequent application KPIs 114, including application KPIs 114 associated with the new replacement instance of the network application 104 in the replacement container 106. The container manager 108 can thus use the subsequent application KPIs 114 to monitor the health and/or performance of the replacement instance of the network application 104, and use the process of FIG. 7 to determine if further corrective actions are to be performed.

However, if the container manager 108 determines at block 706 that the KPI difference associated with the first instance of the network application 104 is not greater than the first threshold, the container manager 108 can determine if the KPI difference is greater than the second threshold at block 708. For example, if the first threshold is set at a 50% difference relative to a target KPI value, the second threshold is set at a 10% difference relative to the target KPI value, and the actual KPI difference is 20%, the container manager 108 would find that the KPI difference is not greater than the first threshold at block 706, but that the KPI difference is greater than the second threshold at block 708. However, if the actual KPI difference is 5% in this example, the container manager 108 would find that the KPI difference is not greater than the first threshold at block 706, and also is not greater than the second threshold at block 708.

If the container manager 108 determines at block 708 that the KPI difference is also not greater than the second threshold, for instance if the application KPIs of the first instance of the network application 104 are not lower than the second threshold by more than the second threshold, then the container manager 108 may determine not to perform any corrective actions and can return to block 702 to continue using the process of FIG. 7 to determine whether any corrective actions should be performed at later points in time and/or on containers 106 associated with other instances of the network application 104.

However, if the container manager 108 determines at block 708 that the KPI difference is less than the first threshold but is greater than the second threshold, the container manager 108 can move to block 712 to determine if a scale-out of the set of containers 106 has already been attempted as a corrective action in response to determining that the KPI difference associated with the first instance of the network application 104 is greater than the second threshold. If such a scale-out has not yet been attempted, the container manager 108 can move to block 714 and perform a scale out to add at least one additional container 106 that executes at least one additional instance of the network application 104. As described above with respect to FIGS. 4A and 4B, scaling out a set of containers 106 by adding at least one additional container 106 can reduce the load on any or all instance of a network application 104 executing within the set of containers 106, and can accordingly result in improved performance of any or all of the previously existing instances of the network application 104. The container manager 108 can return to block 702 to continue using the process of FIG. 7 to determine whether any corrective actions should be performed at later points in time and/or on containers 106 associated with other instances of the network application 104. In some examples, a scale out of a set of containers 106 can also, or alternately, involve the container manager 108 changing an amount of dedicated memory, amount of dedicated processor cycles, and/or an amount of other dedicated computing resources associated with one or more containers 106, which may in some situations result in improved performance of instances of network applications 104 within those containers 106.

However, if the container manager 108 determines at block 712 that a scale out of the set of containers 106 has already been attempted as a corrective action in response to determining that the first instance of the network application 104 is associated with a KPI difference greater than the second threshold, the container manager 108 can determine that the scale out did not resolve health and/or performance problems associated with the first instance of the network application 104. Accordingly, in this situation, the container manager 108 can instead attempt an alternate corrective action at block 710 to replace the container 106 associated with the underperforming first instance of the network application 104 with a replacement container 106 that executes a replacement instance of the network application 104. The container manager 108 can then return to block 702 to continue determining when corrective actions are to be performed.

As example, if the container manager 108 initially determines that a first instance of the network application 104 in a first container 106 is underperforming a target KPI value by 20%, and the second threshold is 10%, the container manager 108 may initially perform a first corrective action of scaling out the set of containers 106 in an attempt to reduce the load on the first instance of the network application 104. However, if subsequent application KPIs 114 indicate that the first instance of the network application 104 continues to underperform the target KPI value by 20% even after additional containers 106 and additional instances of the network application 104 have been added to the set of containers 106 due to the scale out, the container manager 108 can determine that the scale out did not result in improved performance of the first instance of the network application 104. The container manager 108 can accordingly attempt the alternate corrective action of terminating the first container 106 containing the underperforming first instance of the network application 104, and creating a replacement container 106 with a replacement instance of the network application 104. The container manager 108 can then use application KPIs 114 to determine if the replacement instance of the network application 104 performs better than the now-terminated first instance of the network application 104.

In other examples, the container manager 108 can be configured to attempt multiple scale outs of the set of containers 106, before then attempting a replacement of a container 106. For example, application KPIs 114 may indicate that a first instance of a network application 104 is underperforming a target KPI value by 20%. However, adding an additional instance of the network application 104 due to a first scale out of the set of containers 106 may reduce the load on the first instance of the network application 104, such that application KPIs 114 of the first instance of the network application 104 thereafter indicate an underperformance of 10% relative to the target KPI value. In this situation, the container manager 108 may determine that a second scale out should be attempted, which may further reduce the load on the first instance of the network application 104 and thereby allow the first instance of the network application 104 to meet the target KPI value. However, if the second scale out does not further improve the performance of the first instance of the network application 104, the container manager 108 may attempt an alternate corrective action of replacing the first instance of the network application 104 by terminating and replacing an associated container 106.

Figure 8:
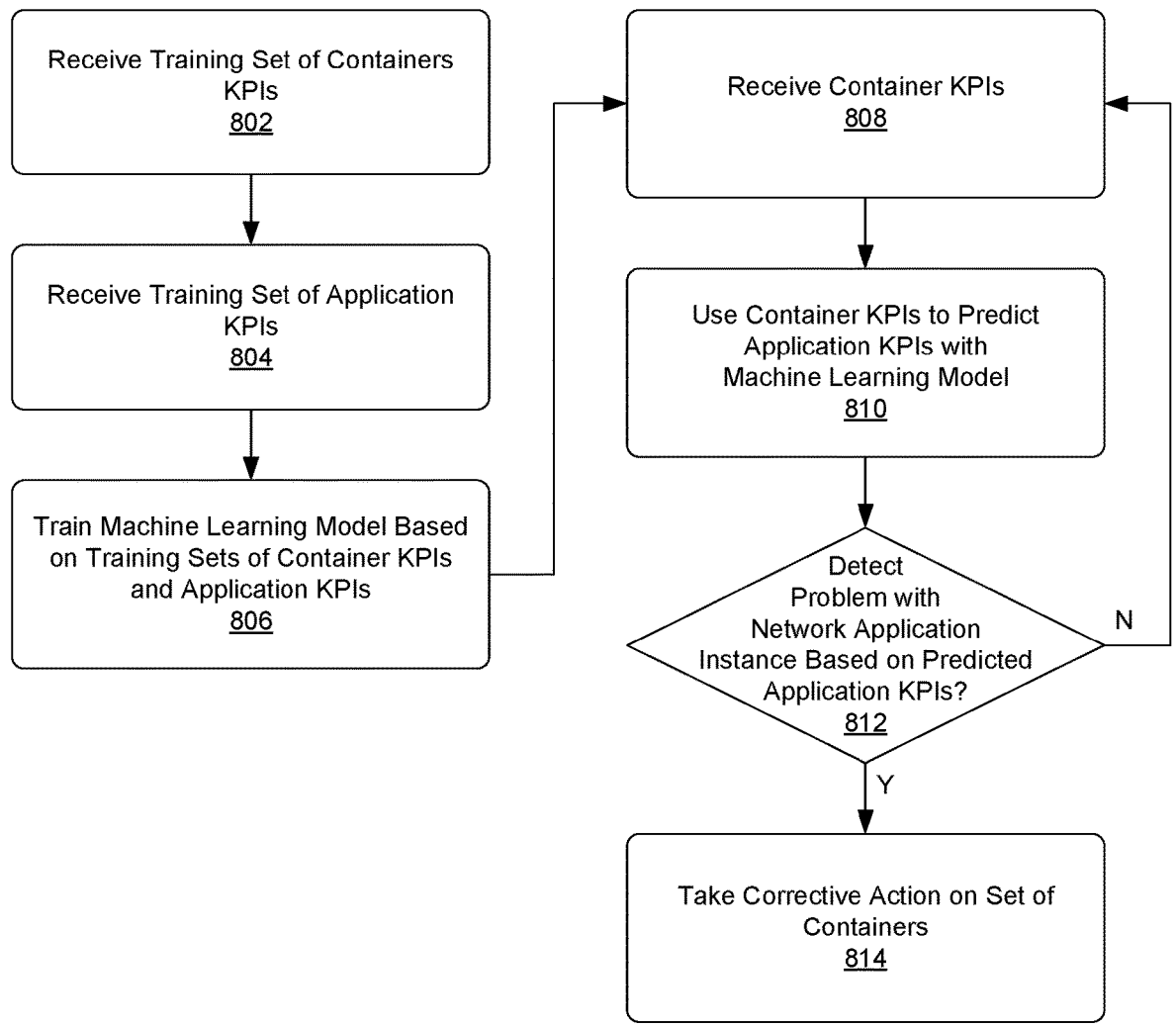
FIG. 8 depicts a flowchart of a method by which a container manager can use a machine learning model to determine corrective actions to perform on a set of containers.

FIG. 8 depicts a flowchart of a method by which a container manager 108 can use a machine learning model 612 to determine corrective actions to perform on a set of containers 106. The machine learning model 612 can be trained based at least in part on container KPIs 112 and application KPIs 114, such that the machine learning model 612 can learn to predict health and/or performance problems associated with instances of network applications 104 running within containers 106 based on container KPIs 112 associated with the containers 106 overall. In some examples, the machine learning model 612 can predict health and/or performance problems associated with on-going issues, and such predictions can be used to determine corrective actions that can attempt to resolve the on-going issues. In other examples, the machine learning model 612 can predict health and/or performance problems that have not yet occurred, and such predictions can be used to determine corrective actions that may prevent the predicted issues from occurring.

At block 802, the container manager 108 can receive a training set of container KPIs 112 associated with the health and/or performance of containers 106 in a set of containers 106 managed by the container manager 108. As discussed above, container KPIs 112 can include metrics about individual containers, such as memory utilization levels, processor utilization levels, and/or other metrics.

At block 804, the container manager 108 can also receive a training set of application KPIs 114 associated with the health and/or performance of instances of one or more network applications 104 executing within the set of containers 106 managed by the container manager 108. As discussed above, application KPIs 114 can include metrics about individual instances of network application 104, such as PDU activation success rates, handover success rates, request timeouts, application level packet drop rates, session throughput statistics, and/or other metrics.

At block 806, the container manager 108 can train a machine learning model 612 based on the training set of container KPIs 112 received at block 802 and the training set of application KPIs 114 received at block 804. For example, the container manager 108 can use supervised machine learning to train the machine learning model 612 to predict the training set of application KPIs 114 based on the training set of container KPIs 112, for instance based on correlations found between container KPIs 112 and application KPIs 114 in the training sets. In this example, application KPIs 114 associated with instances of a network application 104 within different containers 106 can be used as labels of training data for such supervised machine learning, while container KPIs 112 associated with the corresponding containers 106 can be features of the training data. Accordingly, supervised machine learning algorithms can train the machine learning model 612 until patterns, weights, values in container KPIs 112 of the training are found that best correlate with and/or best predict corresponding application KPIs 114 in the training data. In various examples, such supervised machine learning can be based on support-vector networks, linear regression, logistic regression, nearest-neighbor algorithms, decision trees, recurrent neural networks or other types of neural networks, and/or other machine learning and/or artificial intelligence techniques.

After the machine learning model 612 has been trained, the container manager 108 can receive subsequent container KPIs 112 associated with containers 106 at block 808, but may or may not receive subsequent application KPIs 114 from network applications 104 within those containers 106. However, at block 810 the container manager 108 can use the machine learning model 612 to predict application KPIs 114 associated with instances of the network application 104 within the containers 106. For example, the training of the machine learning model 612 may have indicated that certain values and/or patterns of container KPIs 112 related to processor usage, memory usage, and/or other metrics associated with a container 106 overall are correlated with certain values and/or patterns of application KPIs 114 associated with an instance of a network application 104 within that container 106. Accordingly, if new container KPIs 112 indicates such values or patterns associated with a container 106, at block 810 the machine learning model 612 can predict or infer application KPIs 114 associated with an instance of a network application 104 within that container 106.

At block 812, the container manager 108 can use the application KPIs 114 predicted or inferred by the machine learning model 612 based on received container KPIs 112 to detect when an instance of a network application 104 within a container 106 is likely experiencing current problems and/or is likely to experience future problems. For example, the container manager 108 can substantially follow the process of FIG. 7, discussed above, using application KPIs 114 predicted by the machine learning model 612 instead of application KPIs 114 received directly from instances of network applications 104, and can accordingly detect at block 812 when the predicted application KPIs 114 are lower than target KPI values and/or other thresholds. If the predicted application KPIs 114 do not indicate a current or likely future problem with an instance of a network application 104, the container manager 108 can continue receiving additional container KPIs 112 at block 808, and continue looking for problems with instances of network applications 104 in containers based on application KPIs 114 predicted from the received container KPIs 112 at blocks 810 and 812.

However, if predicted application KPIs 114 do indicate a current or likely future problem with an instance of a network application 104 at block 812, the container manager 108 can take a corrective action on the set of containers 106 at block 812. The corrective action may attempt to resolve a current issue with the instance of the network application 104, or attempt to prevent a predicted future issue with the instance of the network application 104. For example, if the predicted application KPIs 114 are lower than a target KPI value by more than a first threshold, the container manager 108 may terminate and replace an associated container 106, as discussed above with respect to block 710 of FIG. 7. As another example, if the predicted application KPIs 114 are lower than a target KPI value by less than a first threshold but more than a second threshold, the container manager 108 may add one or more additional containers 106 and additional instances of the network application 104 to scale out the set of containers 106, as discussed above with respect to block 714 of FIG. 7.

In some examples, the machine learning model 612 and/or container manager 108 overall can determine if a pattern or values of container KPIs 112 are associated with an issue with a container 106 overall, or are associated with an issue with an instance of a network application 104 inside the container 106. For example, the machine learning model 612 may determine that a pattern in received container KPIs 112 corresponds with predicted application KPIs 114 that may indicate a problem with an instance of a network application 104 inside a container, as discussed above. However, the machine learning model 612 may also be trained to recognize when a pattern in received container KPIs 112 is instead indicative of a problem with a container 106 as a whole, such that the container manager 108 can take a corrective action based on a problem with the container 106 itself.

Conclusion

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method of managing a container in a telecommunication network, comprising:
    receiving, by a container manager, an application key performance indicator (KPI) associated with an instance of a network application executing within the container;
    determining, by the container manager, a KPI difference between a target KPI value and the application KPI associated with the instance of the network application executing within the container;
    determining, by the container manager, that the KPI difference exceeds a threshold difference; and
    performing, by the container manager, at least one corrective action associated with the container based on determining that the KPI difference exceeds the threshold difference;
    training, by the container manager, a machine learning model based on correlations between one or more container KPIs from the set of containers and one or more application KPIs including the application KPI; and
    predicting, by the container manager using the machine learning model, one or more subsequent application KPIs associated with the instance of the network application based on subsequent container KPIs from the set of containers.

2. The method of claim 1, wherein the at least one corrective action comprises:
    terminating, by the container manager, the container executing the instance of the network application; and
    creating, by the container manager, a replacement container that executes a replacement instance of the network application.

3. The method of claim 1, wherein the at least one corrective action comprises adding, by the container manager, at least one additional container to a set of containers, wherein the at least one additional container executes at least one additional instance of the network application.

4. The method of claim 1, wherein the at least one corrective action comprises at least one of:
    terminating and replacing, by the container manager and based at least in part on the KPI difference exceeding a first threshold, the container in a set of containers managed by the container manager; or
    adding, by the container manager and based at least in part on the KPI difference exceeding a second threshold that is lower than the first threshold, an additional container to the set of containers.

5. The method of claim 1,
    wherein the application KPI associated with the instance of the network application is one of the one or more subsequent application KPIs predicted for the instance of the network application.

6. The method of claim 1, further comprising deriving, by the container manager, the target KPI value based on statistical data associated with values of the application KPI associated with a set of instances of the network application executing within a set of containers.

7. The method of claim 1, wherein the network application is a fifth generation (5G) network function.

8. The method of claim 7, wherein the 5G network function comprises at least one of a Session Management Function (SMF), a User Plane Function (UPF), or an Access and Mobility Management Function (AMF).

9. The method of claim 1, wherein the application KPI includes at least one of:

a Protocol Data Unit (PDU) activation success rate;
a handover success rate;
a request timeout;
an application level packet drop rate;
a session average throughput metric;
a number of failed sessions;
call latency information;
dropped call information; or
a number of messages rejected by other instances of network applications in other containers.

10. A container manager, comprising:
one or more processors; and
memory storing computer-executable instructions that, when executed by the one or more processors, cause the container manager to perform operations comprising:
receiving application key performance indicators (KPIs) associated with a set of instances of a network application executing within a set of containers;
determining a KPI difference between a target KPI value and first application KPIs associated with a first instance of the network application executing within a first container in the set of containers;
determining that the KPI difference exceeds a threshold difference; and
performing at least one corrective action on the set of containers based on determining that the KPI difference exceeds the threshold difference,
wherein an application KPI associated with the first instance of the network application is received by the container manager from a second instance of a second network application executing within a second container, and
wherein the network application is a first type of fifth generation (5G) network function and the second network application is a second type of 5G network function.

11. The container manager of claim 10, wherein the at least one corrective action comprises at least one of:
terminating the first container executing the first instance of the network application and creating a replacement container in the set of containers that executes a replacement instance of the network application, or
adding at least one additional container to the set of containers that executes at least one additional instance of the network application.

12. The container manager of claim 10, wherein the operations further comprise:
receiving container KPIs from the set of containers;
training a machine learning model based on correlations between the container KPIs and the application KPIs;
receiving subsequent container KPIs from the set of containers; and
predicting, using the machine learning model, subsequent application KPIs associated with the set of instances of the network application based on the subsequent container KPIs,
wherein the first application KPIs associated with the first instance of the network application are the subsequent application KPIs predicted for the first instance of the network application.

13. The container manager of claim 10, wherein the operations further comprise deriving the target KPI value based on statistical data associated with values of the application KPIs associated with the set of instances of the network application executing within the set of containers.

14. The container manager of claim 10, wherein the application KPIs include at least one of:

Protocol Data Unit (PDU) activation success rates;
handover success rates;
request timeouts;
application level packet drop rates;
session average throughput metrics;
a number of failed sessions;
call latency information;
dropped call information; or
a number of messages rejected by other instances of network applications in other containers.

15. One or more non-transitory computer-readable media storing computer-executable instructions that, when executed by one or more processors of at least one computing device of a telecommunication network, cause the at least one computing device to perform operations comprising:
receiving application key performance indicators (KPIs) associated with a set of instances of a network application executing within a set of containers;
determining a KPI difference between a target KPI value and first application KPIs associated with a first instance of the network application executing within a first container in the set of containers;
determining that the KPI difference exceeds a threshold difference; and
performing at least one corrective action on the set of containers based on determining that the KPI difference exceeds the threshold difference,
training a machine learning model based on correlations between container KPIs from the set of containers and the application KPIs; and
predicting, using the machine learning model, subsequent application KPIs associated with the set of instances of the network application based on subsequent container KPIs from the set of containers.

16. The one or more non-transitory computer-readable media of claim 15, wherein the at least one corrective action comprises at least one of:
terminating the first container executing the first instance of the network application and creating a replacement container in the set of containers that executes a replacement instance of the network application, or
adding at least one additional container to the set of containers that executes at least one additional instance of the network application.

17. The one or more non-transitory computer-readable media of claim 15,
wherein the first application KPIs associated with the first instance of the network application are the subsequent application KPIs predicted for the first instance of the network application.

18. The one or more non-transitory computer-readable media of claim 15, wherein the operations further comprise deriving the target KPI value based on statistical data associated with values of the application KPIs associated with the set of instances of the network application executing within the set of containers.

19. The one or more non-transitory computer-readable media of claim 15, wherein the application KPIs include at least one of:
Protocol Data Unit (PDU) activation success rates;
handover success rates;
request timeouts;
application level packet drop rates;
session average throughput metrics;
a number of failed sessions;
call latency information;

dropped call information; or a number of messages rejected by other instances of network applications in other containers.

\* \* \* \* \*